United States Patent [19]
Dahle et al.

[11] 3,861,203
[45] Jan. 21, 1975

[54] MAGNETOELASTIC TRANSDUCER

[75] Inventors: Orvar Dahle; Folke Von Knorring, both of Vasteras, Sweden; Nils Gylén, deceased, late of Vasteras, Sweden by Lilly Gylén, administratrix

[73] Assignee: Allmanna Svenska Elektriska Aktiebolaget, Vasteras, Sweden

[22] Filed: Dec. 27, 1972

[21] Appl. No.: 318,908

[30] Foreign Application Priority Data
Jan. 3, 1972   Sweden .................................... 5/72

[52] U.S. Cl. ............................ 73/88.5 R, 73/DIG. 2
[51] Int. Cl. .............................................. G01b 7/24
[58] Field of Search ........... 73/88.5 R, 141 A, 88 R, 73/DIG. 2; 336/20, 65; 310/26; 324/34 MA, 34 ST

[56] References Cited
UNITED STATES PATENTS
2,895,332   7/1959   Dahle et al. ..................... 73/141 A
3,059,710   10/1962   Pien ................................. 73/88.5 X
3,103,810   9/1963   Agerman et al. ................. 73/141 A
3,184,963   5/1965   Dahle ............................. 73/88.5 R
3,379,053   4/1968   Berglund et al. ................ 73/88.5 R
3,572,091   3/1971   McFarland ......................... 73/88 R
3,681,982   8/1972   Hiratsuka et al. ................ 73/141 A
3,742,759   7/1973   Nishimura ........................ 73/141 A FOREIGN PATENTS OR APPLICATIONS
718,194   9/1965   Canada .......................... 73/DIG. 2

Primary Examiner—Richard C. Queisser
Assistant Examiner—Stephen A. Kreitman

[57]   ABSTRACT

A magnetoelastic transducer for measuring stresses is formed of a disc-shaped core of magnetostrictive material provided with four channels perpendicular to the plane of the disc and arranged at the corners of a square figure. It is placed in a circular opening of the object to be tested. Stresses are transmitted to the disc from the object through four transmission elements situated equidistant from each other and symmetrically arranged in relation to the diagonals of the square.

10 Claims, 38 Drawing Figures

MAGNETOELASTIC TRANSDUCER

BACKGROUND OF THE INVENTION

1. Field of the Invention

This invention relates to a magnetoelastic transducer mounted in an object in which forces are to be measured.

2. The Prior Art

In order to measure mechanical stresses in ferromagnetic materials, preferably iron, it has been suggested to drill a circular cylindrican hole in the material and to insert a transducer of magnetoelastic type into the hole, said transducer having windings for generating a magnetic flux in the material around the hole and for sensing the changes in the flux which occur when the material is influenced by a mechanical force. The air gap, which is always present between the transducer and the walls of the hole into which the transducer is inserted, contributes a considerable part of the total reluctance for the magnetic flux. When the material is strained by mechanical forces, a certain change of said reluctance also takes place, and this results in the measurement becoming somewhat uncertain. The measurement will also become dependent on the temperature, because the air gaps change irregularly due to thermal expansion and because the penetration depth of the flux varies with the temperature. The function is also easily disturbed by external magnetic fields, which sometimes cannot be prevented from penetrating the measuring body.

In another well-known magnetoelastic transducer the magnet field is enclosed in the iron core of the transducer, said iron core being subjected to the mechanical forces to be measured. In this type of transducer the magnetic flux paths are well-defined, the temperature influences are small and consistent and therefore easily compensated, and screening against external magnetic fields is generally easy to accomplish. On the other hand, these transducers tend to be bulky, as they must be dimensioned to withstand the whole force to be measured, and the flat surfaces through which the force is transmitted to the transducer must be machined with great precision both on the transducer and in the surrounding force transmitting structure.

SUMMARY OF THE INVENTION

The object of the present invention is to provide a transducer which has the advantage of keeping the magnetic flux inside the transducer, while at the same time permitting a simple and reliable way of fitting the transducer in a strained structure, which can be designed to withstand the total measuring force while transmitting a well-defined proportion thereof to the transducer, or which is part of an existing machine or construction in which it is desired to monitor the stresses.

A transducer according to the invention comprises a disc-shaped core of magnetostrictive material which is provided with four channels perpendicular to the plane of the disc, said channels being arranged at the corners of a preferably square figure. In the channels there are windings for generating a magnetic flux in the core and for sensing the changes in the flux which occur when the core is affected by mechanical forces. According to the invention, the transducer is shaped for press or shrink fitting into a hole made for this purpose in the measuring object. For transmission of the stresses in the measuring object to the core, there are four force transmitting elements arranged between the core and the measuring object, said force transmitting elements being situated equidistantly from each other and symmetrically arranged in relation to the diagonals in said figure.

BRIEF DESCRIPTION OF THE DRAWINGS

In the accompanying drawings

DESCRIPTION OF THE PREFERRED EMBODIMENTS

Figure 1:
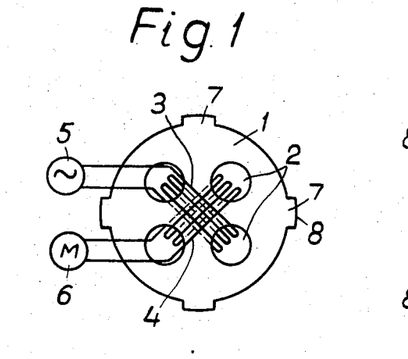
FIG. 1 shows a view of the transducer.

The transducer according to the invention consists, according to FIG. 1, of core 1 of a laminated magnetic material in the form of substantially circular plates which are bonded to form a packet. Four holes are punched in the plates and positioned so that they are located at the corners of a preferably square figure. When the plates have been laid on top of each other, four parallel channels which are perpendicular to the laminations are formed in the core. Alternatively, the channels can be drilled or cut after bonding the plates to a packet. These channels contain two windings 3 and 4 which are perpendicular to each other, the first of said windings being connected to an alternating-current source 5 for generating a magnetic flux in the core. The other winding is connected to a measuring device 6 to indicate the changes of the magnetic flux in the core which occur when the core is stressed by mechanical forces. In some cases, especially if the transducer will not be subjected to great forces, the core could also be made of a ferromagnetic ceramic material.

The core is provided with four radially directed projections 7 on its peripherical surface, said projections forming elements for transmitting the mechanical forces to the transducer. Their free surfaces 8 which face away from the core are shaped as force application surfaces for the forces, the difference of which is to be measured. The projections are positioned equidistantly from each other, so that they are arranged diametrically opposite in pairs. Further they lie symmetrically half-way between the diagonals of the square, at the corners of which the holes 2 are located.

Figure 2A:
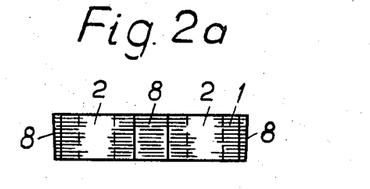
FIG. 2a is a side view of a core with conical force application surfaces.
Figure 2B:
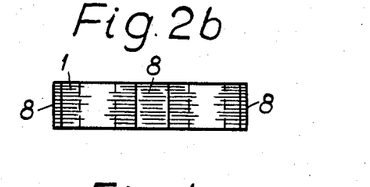
FIG. 2b is a corresponding side view with cylindrical force application surfaces.

FIG. 2a shows a side view of a core, in which the force application surfaces are shaped as parts of a conical surface, the axis of which is perpendicular to the plane of the core. FIG. 2b shows a corresponding side view of a core in which the force application surfaces are parts of a cylinder.

The transducer is intended to be inserted into a preferably conical hole in a material body, the stresses of which are to be examined.

Figure 3:
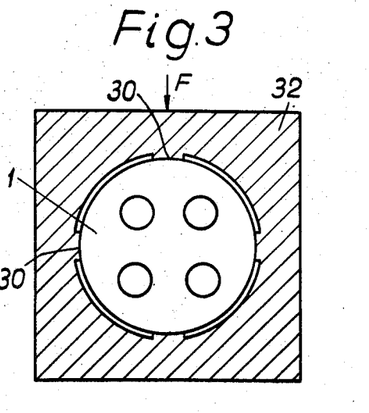
FIGS. 3 and 4 show two more ways of designing the force transmitting elements.
Figure 4:
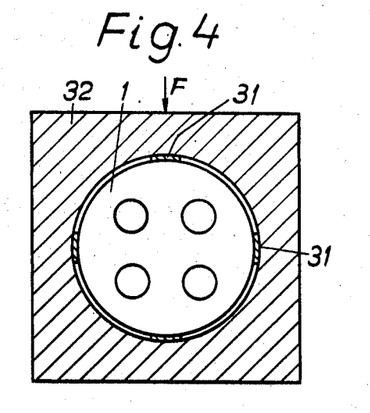

The transducer is then machined so that the force application surfaces consist of parts of a conical surface, and in order to achieve good contact between the transducer and the material said conical surface and the hole in the material should have the same conicity. Instead of forming the force transmitting elements as parts of the core, the core may be made wholly circular and the force transmitting elements provided in other ways. FIGS. 3 and 4 show some alternative arrangements of the force transmission between the measuring body and the core of the transducer. The forces from the stresses occurring in the body 32, which stresses are caused for example by an external force F, are transmitted to the transducer by means of the force transmitting elements, which are represented in FIG. 3 by bars 30 protruding from the hole surface. The free surfaces of said bars are machined to make good contact with the core 1 of the transducer. According to FIG. 4, the hole in the body 32 as well as the surface of the transducer is smooth and the force is transmitted by strips 31, inserted between the transducer and the hole surface.

Figure 5:
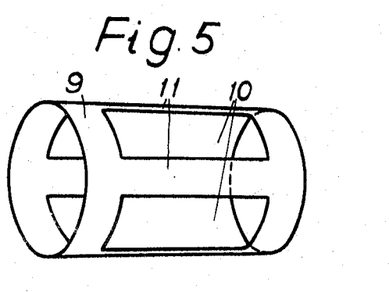
FIG. 5 shows a mounting sleeve for the transducer.

In order to make it easier to fit the transducer and to achieve the correct prestressing, it is sometimes suitable to fix the transducer in a sleeve which is then put into the hole in the body, the stresses of which are to be examined. In cases where there is a risk of disturbance from external magnetic fields, the sleeve suitably consists of non-magnetic material, for example brass or some other material, preferably one with substantially the same coefficient of thermal expansion as steel. A material of this kind is an alloy known by the name of Inconel. The sleeve will then function as a magnetic isolation from the disturbing magnetic fields as well. FIG. 5 shows an example of such a sleeve 9. In order to make the sleeve more flexible in the radial direction, it is provided with a number of longitudinal gaps 10. The transducer is inserted in the sleeve so that the projections 7 make contact with their force application surfaces 8 against the strips 11 located between the slits. The width of the projections 7 is preferably, but not necessarily, approximately the same as that of said strips. The longitudinal gaps 10 can be omitted, and sufficient radial flexibility can also be achieved by making the sleeve of so thin a material that is is somewhat deformed when the transducer is pressed in. Conversely, the projections 7 may be omitted and the strips 11 can take on the function of the strips 31 shown in FIG. 4. Also other embodiments of the sleeve are conceivable. The important thing is that the transducer is kept in position in the sleeve and that this makes good contact with the hole surface in the measuring body. The sleeve may be conical or cylindrical both outwardly and inwardly, conical on the outside and cylindrical on the inside or the reverse.

Figure 6:
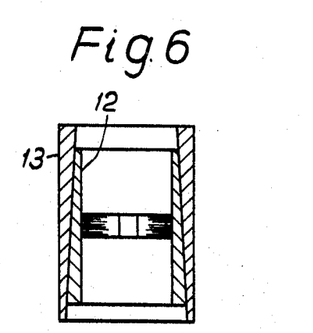
FIG. 6 shows the use of two conical sleeves.

FIG. 6 shows how to fix a cylindrical transducer in a cylindrical hole by means of two conical sleeves 12 and 13. The transducer is pressed into the inner sleeve 12 which is cylindrical on the inside and conical on the outside. The outer sleeve 13 is cylindrical on the outside and conical on the inside. The conicity should be the same on the two surfaces which face each other. When mounting the transducer in its measuring location, the outer sleeve 13 is first pushed into the cylindrical hole in the body which is affected by forces. After this the inner sleeve 12 is pushed into the outer sleeve and pressed so far that the desired prestressing on the transducer is obtained.

Figure 7:
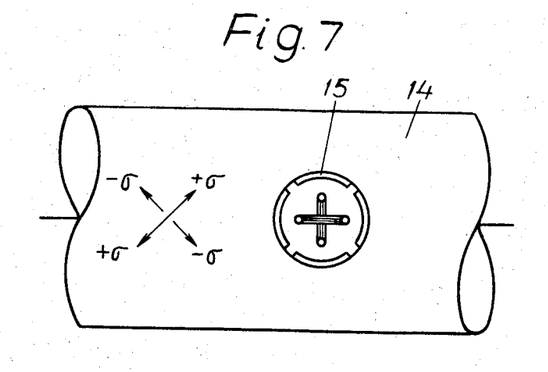
FIG. 7 shows the transducer applied to a shaft for measuring the torque.

FIG. 7 shows how the transducer can be used for measuring the torque in a shaft 14. A circular hole 15 is made in the surface of the shaft, and in this hole the transducer is placed so that the connecting line between two diametrically located projections is parallel to the principal directions $+\sigma$ and $-\sigma$ of the shear stress field.

Figures 8, 9:
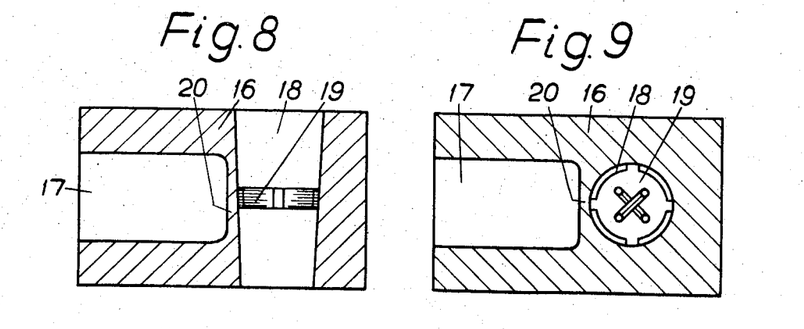
FIGS. 8 and 9 show the transducer used in a pressure transducer.

FIGS. 8 and 9 show the transducer used as a sensing element in a pressure transducer. In a housing 16 a cylindrical cavity 17 has been made, to which the pressure to be measured is supplied. Perpendicular to the pressure medium cavity 17 is a channel 18 for a transducer 19. The distance between the cavity and the channel is so chosen that a diaphragm 20 is formed between them, and the transducer is placed in such a way in its channel that a force-transmitting projection makes contact with the centre of the diaphragm.

Figures 10, 11:
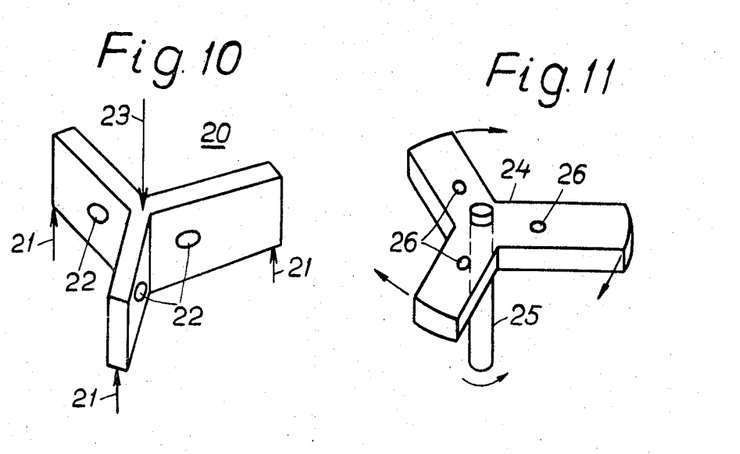
FIGS. 10 and 11 show a few embodiments in which the transducer is arranged to measure shear forces in a structure.

As shown in FIG. 10, transducers can be mounted symmetrically in a tripod 20, the three arms of which are supported at their free ends, as indicated by the upwardly directed arrows 21. The transducers are positioned in holes 22 in the arms, and the force which is to be measured is applied in the centre of the tripod and is indicated by the arrow 23. When the tripod is loaded in the direction of the arrow 23, shear forces occur in the arms on the tripod. The transducers are oriented in such a way in the holes that they sense the principal stresses associated with the shear force. By adding the signals from the three transducers, the total acting force is obtained.

A similar means can be used, according to FIG. 11, for determining the torsional force in a shaft or coupling. A multiple-armed member 24 is attached on a shaft 25. Each arm supports a transducer in the holes 26, which is arranged in such a way that it senses the shear forces occurring in the arm. If the shaft is twisted clockwise with a certain torque F marked by arrow 27, forces f must be applied on the arms in the arm-cross, for example at their free ends, so that the system maintains its equilibrium. These forces are marked by arrows 28 and create shear forces in the arms, which are indicated by the transducers. The sum of the output signals will thus become a measure of the torque in the shaft 25.

Figures 12A, 12B:
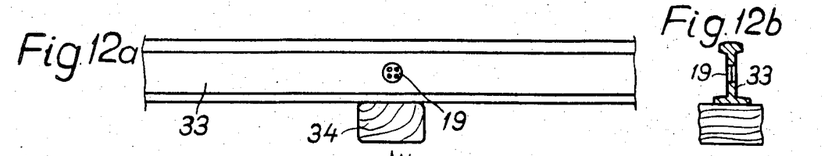
FIGS. 12a, 12b, 12c, 13a, 13b, 13c, 14a, 14b, 14c show the transducer used as a wheel position transducer in railway rails.

FIG. 12a shows a side view of the transducer 19 mounted in the web of a railway rail 33 for indication of the wheel position. FIG. 12b is a cross section through the rail. The transducer is positioned directly above a sleeper 34 and oriented for measuring vertical compressive stress. This means gives a simple position indication with moderate accuracy, as indicated by the curve in FIG. 12c showing the output signal of the transducer.

Figures 12C, 13A, 13B:
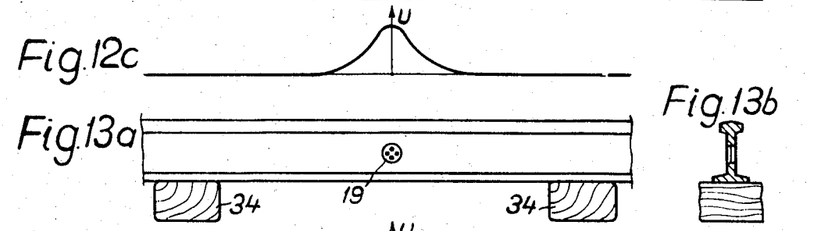

FIGS. 13a and 13b show the transducer used for wheel position indication as in FIG. 12a, but here the transducer is placed between two sleepers 34 and oriented for measuring the shear force. When the wheel passes over the transducer the shear force acting on the transducer changes signal. If the signal from the transducer is phase-coherently demodulated it will depend on the wheel position in the way shown in FIG. 13c. The steep zero passage gives a sharp position indication.

Figures 13C, 14A, 14B:
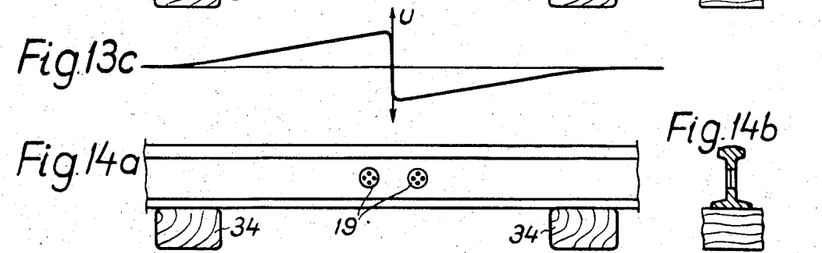

As a variant of the means according to FIG. 13a, it is also possible to place two counter-connected shear-sensing transducers at some distance away from each other between two sleepers, as shown in FIG. 14a. When the wheel is half-way between the two transducers, a sharp signal maximum is obtained, as shown in FIG. 14c, whereas the signal is zero when the wheel is at some distance away from the holes.

The transducer can also be used for weighing rail vehicles in motion. In this case two transducers 19 are used, as shown in FIG. 15a, the signals of which are added. The distance between the transducers have been chosen here as large as possible without getting too close to the sleepers 34. During the time the wheel makes contact with the rail 33 within the range 35 in FIG. 15c, which shows the summed output signal of the transducers, the measuring value will be constant, since the sum of the shear forces at the two measuring points is constant.

Figures 14C, 15A, 15B:
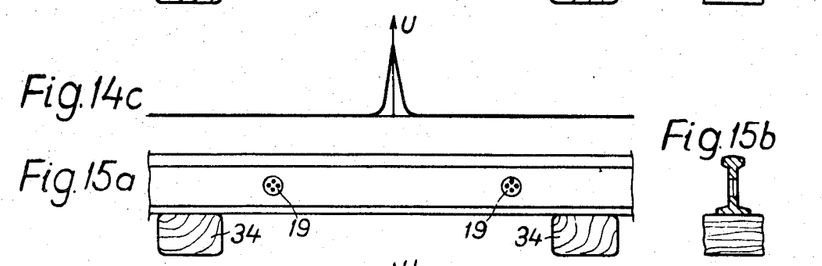
FIGS. 15a, 15b, 15c show an application to weighing rail vehicles.
Figure 15C:
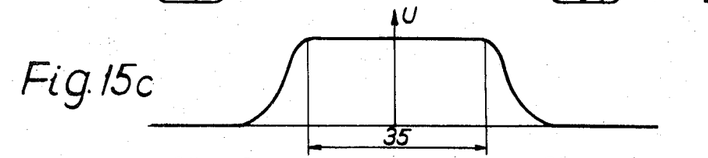
Figure 16:
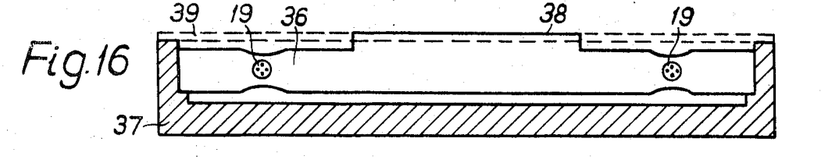
FIG. 16 shows the use of the transducer in a low platform scale.

FIG. 16 shows a low platform scale working on the same principle as the arrangement of FIG. 15a. Beams 36 with two transducers 19 are fitted into a stiff frame 37. The beams support a weighing plane 38 for the goods to be weighed. In an alternative embodiment the scale is covered by a resilient plate 39, indicated by broken lines in the figure. This is especially intended for weighing vehicles which are not rail-running, for example cars. The scale may then be suitably placed in a recess in the ground.

Figure 17:
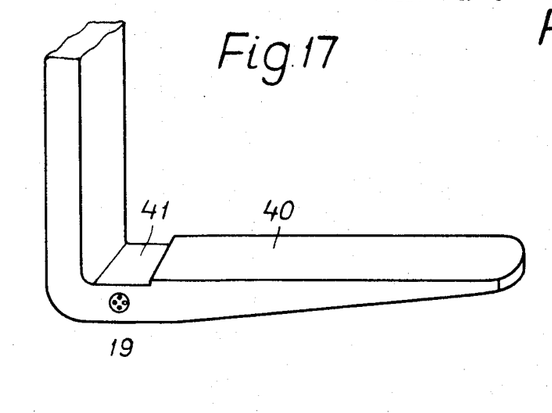
FIG. 17 shows the transducer mounted for weighing in a fork of a fork truck.

To weigh the load in fork trucks, shear-force sensing transducers 19 may be placed in the lifting forks 40 as shown in FIG. 17. The transducers are placed close to the bend in the fork in a part 41 where the upper surface is somewhat countersunk to ensure that no part of the load by-passes the transducers.

Figures 18A, 18B:
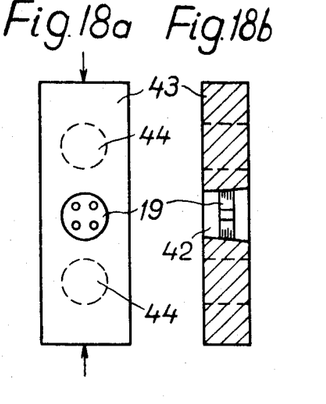
FIGS. 18a and 18b show the use of the transducer for measuring compressive force and FIGS. 19a and 19c for measuring tensile force.
Figures 19A, 19B:
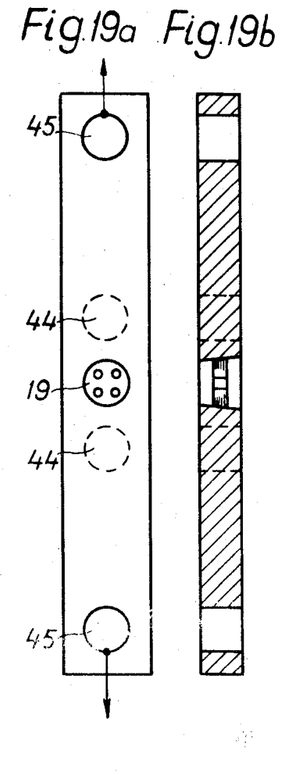

FIGS. 18a and 18b show the use of the transducer for measuring compressive force. The transducer 19 is then inserted into a preferably conical hole 42 in a pillar-shaped measuring element 43. In order to increase the linear measuring range, stress-relieving holes can be introduced on both sides of the transducer, as has been indicated by broken lines. When measuring tensile force the measuring element 43 is extended and holes 45 for the application of the tensile force are made at the ends of said measuring element, for example as shown in FIGS. 19a and 19b.

Figure 20:
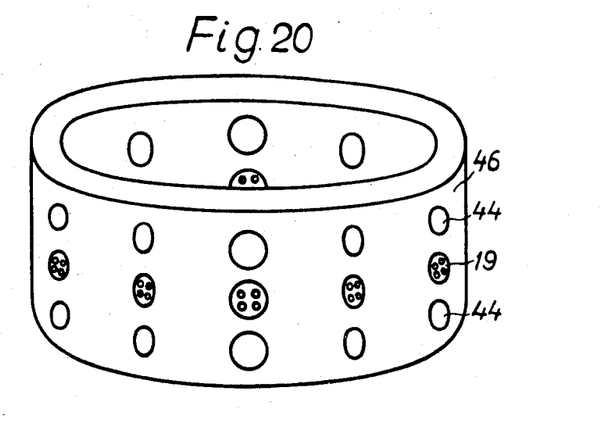
FIGS. 20, 21 and 22a and 22b show further suggestions for load cell designs utilizing the invention.

When measuring great forces a ring-shaped load cell body 46 may be used, in which transducers are fitted, according to FIG. 20. In this case, the transducers are placed in a number of conical holes around the sensing element and here also stress-relieving holes 44 are arranged above and below the transducers to extend the linear measuring range.

Figure 21:
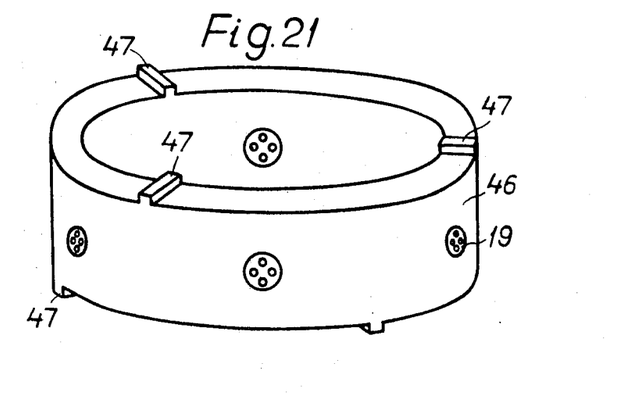

FIG. 21 shows another type of ring-shaped load cell, in which the transducers are arranged for shear force sensing. The tubular load cell body is provided at its end surfaces with bosses 47 located between the holes for the transducers.

Figure 22A:
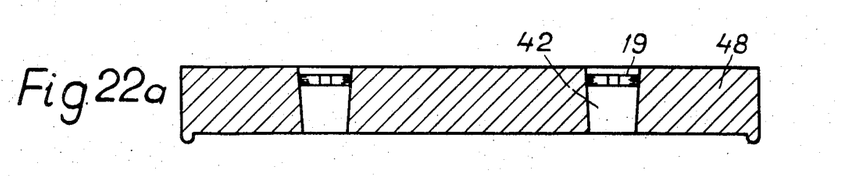
Figure 22B:
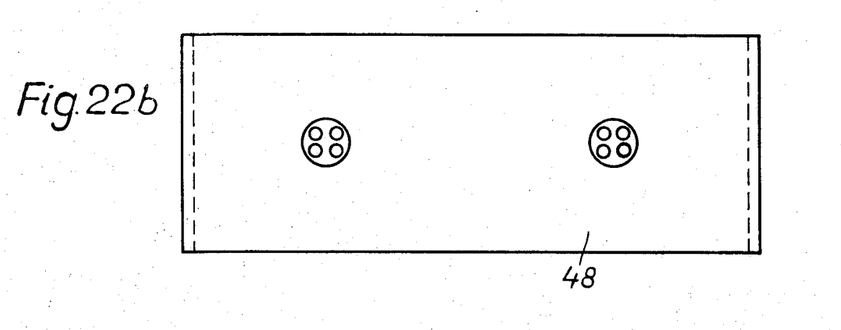

FIGS. 22a and 22b show an extremely low load cell element, formed as a beam 48 placed on its low edge. The transducers 19 are positioned into conical holes 42 at the upper edge of the beam and sense the compression stress there. Addition of the signals from the transducers makes the measuring value in principle independent of a moderate longitudinal displacement of the force application point.

Figure 23:
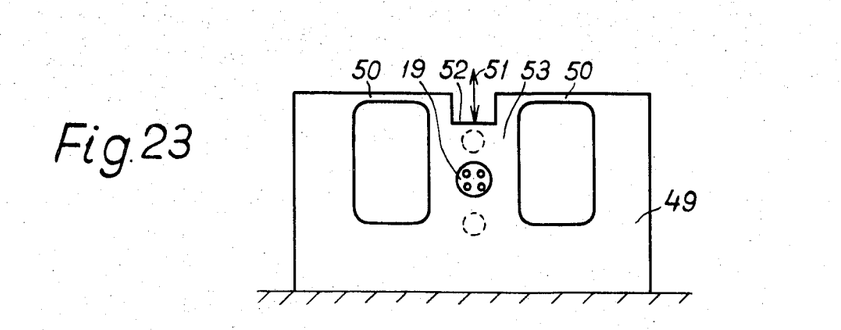
FIG. 23 shows a load cell design intended to measure vertical forces.

FIG. 23 shows a load cell configuration where horizontal disturbing forces are absorbed by horizontal leaf springs 50. Vertical forces acting in the direction of the arrow 51 make their attack at the upper part of the load cell and are transmitted through the central part 53 to the transducer 19, which is arranged for measuring compressive or tensile forces.

Figure 24:
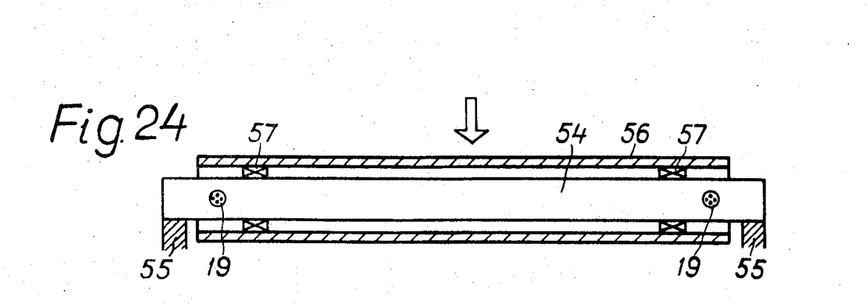
FIG. 24 shows a means for measuring forces acting an a shaft.

The measuring device according to FIG. 24 has a stationary shaft 54 supported by supports 55. A rotating roll, sheave or similar device 56 is supported by the shaft by means of bearings 57. Between the bearings 57 and the supports 55 the transverse forces in the shaft are measured by means of shear sensing transducers 19.

Figure 25:
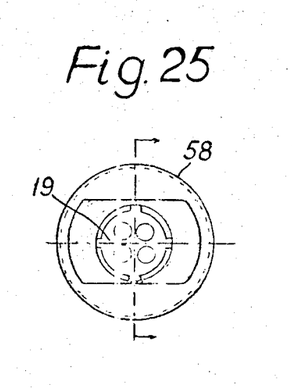
FIGS. 25 and 26 show a transducer used as a pressure measuring device.
Figure 26:
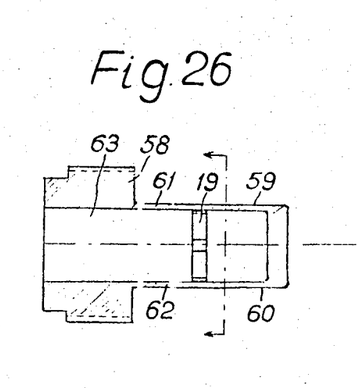

FIGS. 25 and 26 show another way of using the invention in a pressure transducer. The measuring body is a piece 58 of round bar stock, which is machined flat on two sides 59 and 60. The force transducer is fitted in an axially drilled cavity. The pressure is sensed through the two thin walls 61, 62 formed between the central cavity 63 and the flats, against which two of the force transmitting elements of the transducer bear. The measuring body is fixed (e.g. in the wall of a pressure vessel) so that the flat protrudes into the pressure medium.

What is claimed is:

1. In combination with an object in which forces are to be measured, a magnetoelectric transducer for measuring mechanical stresses in said object, said object having a hole therein, said transducer comprising a disc-shaped core of magnetostrictive material which is provided with four channels perpendicular to the plane of the disc, said channels being arranged substantially at the corners of a square figure, windings in said channels for generating a magnetic flux in the core and for sensing the changes in the flux which occur when the core is affected by mechanical forces, the transducer fitting tightly in the hole and four force transmitting elements between the periphery of the disc and the inside wall of the hole to transmit the stresses in the object to the core, said transmission elements being situated equidistantly from each other and symmetrically arranged in relation to the diagonals of said figure.

2. In a combination according to claim 1, the core being built up of a number of plates which are substantially circular.

3. In a combination according to claim 1, the force transmitting elements comprising radially directed projections (7) on the core, said projections having their free surfaces (8), which fall away from the core, shaped as force application surfaces.

4. In a combination according to claim 1, the force transmitting elements comprising bars (30) which are formed on the inner surface of the hole in the object.

5. In a combination according to claim 1, the force transmitting elements comprising strips (31) between the core and the inner surface of the hole.

6. In a combination according to claim 1, surfaces (8) of the force transmitting elements constituting parts of a conical surface.

7. In a combination according to claim 1, in which the surfaces (8) of the force transmitting elements constituting parts of a cylindrical surface.

8. In a combination according to claim 1, a casing (9) which is resilient in the radial direction between the peripheral surface of the disc and the inside of the hole.

9. In a combination according to claim 8, the casing being made of a non-magnetic material.

10. In a combination according to claim 8, the casing having a number of gaps (10) running substantially axially and that the parts of the casing remaining between the gaps forming strips to support the transducer and simultaneously work as force transmitting elements.

* * * * *